(12) United States Patent
Ryu

(10) Patent No.: US 11,379,867 B2
(45) Date of Patent: Jul. 5, 2022

(54) METHOD FOR AUTOMATICALLY PROVIDING CRYPTOCURRENCY TO RECOMMENDER USING PROPAGATION ON SNS

(71) Applicant: Sang Mi Ryu, Incheon (KR)

(72) Inventor: Sang Mi Ryu, Incheon (KR)

(*) Notice: Subject to any disclaimer, the term of this patent is extended or adjusted under 35 U.S.C. 154(b) by 0 days.

(21) Appl. No.: 17/010,797

(22) Filed: Sep. 2, 2020

(65) Prior Publication Data

US 2020/0402091 A1 Dec. 24, 2020

Related U.S. Application Data

(63) Continuation-in-part of application No. 16/138,617, filed on Sep. 21, 2018, now abandoned.

(30) Foreign Application Priority Data

Jun. 19, 2018 (KR) .......................... 10-2018-0070307

(51) Int. Cl.
*G06Q 30/02* (2012.01)
*G06Q 50/00* (2012.01)
*G06Q 20/06* (2012.01)
*G06Q 20/38* (2012.01)
*G06Q 40/04* (2012.01)
(Continued)

(52) U.S. Cl.
CPC ..... *G06Q 30/0214* (2013.01); *G06Q 20/0655* (2013.01); *G06Q 20/384* (2020.05); *G06Q 20/38215* (2013.01); *G06Q 30/0215* (2013.01); *G06Q 30/0236* (2013.01); *G06Q 40/04* (2013.01); *G06Q 50/01* (2013.01); *H04L 9/0637* (2013.01); *G06Q 20/3678* (2013.01); *G06Q 2220/00* (2013.01); *H04L 2209/38* (2013.01); *H04L 2209/56* (2013.01)

(58) Field of Classification Search
CPC .... G06Q 30/02; G06Q 30/0214; G06Q 50/01; G06Q 20/0655; G06Q 20/384; G06Q 20/38215; G06Q 30/0215; G06Q 40/04; G06Q 30/0236; G06Q 2220/00; G06Q 30/0207–30/0277; H04L 9/0637; H04L 2209/56; H04L 2209/38
See application file for complete search history.

(56) References Cited

U.S. PATENT DOCUMENTS 10,509,919 B1 * 12/2019 Wang .................. G06Q 20/401
10,521,196 B1 * 12/2019 Wang ........................ G06F 8/33
(Continued)

*Primary Examiner* — Thuy N Nguyen
(74) *Attorney, Agent, or Firm* — Antonio Ha & U.S. Patent, LLC

(57) ABSTRACT

According to an embodiment, a method for automatically providing a cryptocurrency to a recommender using social networking service (SNS) propagation comprises a recommending step in which a blockchain membership node of a member having membership in a proof-of-expansion (PoX) blockchain platform server recommends an identity (ID) of an SNS friend of the member to the PoX blockchain platform server, a registering step in which the PoX blockchain platform server newly registers the ID of the SNS friend as a blockchain membership node, and a reward rate determining step in which the PoX blockchain platform server determines a reward rate for each blockchain member in association with the number of SNS friend IDs that the blockchain member recommends.

1 Claim, 6 Drawing Sheets

(51) Int. Cl.
*H04L 9/06* (2006.01)
*G06Q 20/36* (2012.01)

(56) References Cited

U.S. PATENT DOCUMENTS

| | | | | |
|---|---|---|---|---|
| 2010/0227675 | A1* | 9/2010 | Luxton | G07F 17/3272 |
| | | | | 463/25 |
| 2011/0276376 | A1* | 11/2011 | Schmitt | G06Q 30/0207 |
| | | | | 705/14.16 |
| 2015/0095127 | A1* | 4/2015 | Patel | G06Q 50/01 |
| | | | | 705/14.16 |
| 2015/0142540 | A1* | 5/2015 | Okamoto | G06Q 30/0214 |
| | | | | 705/14.16 |
| 2015/0170112 | A1* | 6/2015 | DeCastro | G06Q 20/381 |
| | | | | 705/39 |
| 2015/0363219 | A1* | 12/2015 | Kasturi | H04L 41/5058 |
| | | | | 718/1 |
| 2016/0180386 | A1* | 6/2016 | Konig | G06Q 30/0255 |
| | | | | 705/14.55 |
| 2016/0342989 | A1* | 11/2016 | Davis | G06Q 20/385 |
| 2017/0005804 | A1* | 1/2017 | Zinder | H04L 9/3239 |
| 2017/0339101 | A1* | 11/2017 | Suga | H04L 61/1511 |
| 2018/0240304 | A1* | 8/2018 | Blatstein | G06Q 30/0641 |
| 2018/0293556 | A1* | 10/2018 | Hyun | H04L 9/3297 |
| 2019/0102758 | A1* | 4/2019 | Wright | G06Q 20/40 |
| 2019/0303362 | A1* | 10/2019 | Yang | H04L 9/0637 |

* cited by examiner

Fig. 5

| membership grade | Prover | Star | Planet | Galaxy | Universe |
|---|---|---|---|---|---|
| recommender | 1 | 10 | 50 | 250 | 1,000 |
| reward rate | 1coin | 3coins | 7coins | 10coins | 40coins |

METHOD FOR AUTOMATICALLY PROVIDING CRYPTOCURRENCY TO RECOMMENDER USING PROPAGATION ON SNS

CROSS-REFERENCE TO RELATED APPLICATIONS

This patent application is a continuation-in-part of U.S. patent application Ser. No. 16/138,617, filed on Sep. 21, 2018, which claims priority under 35 U.S.C. § 119 to Korean Patent Application No. 10-2018-0070307, filed on Jun. 19, 2018, in the Korean Intellectual Property Office, the disclosure of which is incorporated by reference herein in its entirety.

TECHNICAL FIELD

Embodiments of the disclosure relate to methods for automatically providing cryptocurrencies, and more specifically, to methods for automatically providing cryptocurrencies to a recommender using propagation on SNS.

DISCUSSION OF RELATED ART

Cryptocurrencies are distributed and are created based on the technology of the blockchain which is a sort of distributed ledger.

A decentralized network may store and reference common information in the blockchain. In the blockchain, blocks are typically generated substantially simultaneously and each block commonly contains information units called transactions. Blocks in the blockchain are linked by inserting their hash values in fields designated in next subsequent blocks of the blockchain.

As a distributed database, the blockchain steadily updates transaction records, and by its design nature, has a tolerance to data modifications made by a particular node.

The blockchain imposes a consensus algorithm to store all updated data to the shared public ledger of each node. By doing so, each node may participate in the network with anonymity, connection failure, or insufficient reliability.

Further, the blockchain does not require any centralized database, and unlike conventional ledgers, such as ones recording all transactions of promissory notes, receipts, or checks, the blockchain may function as a platform for safe, transparent savings and transactions.

The blockchain is typically divided into two major classifications, public and non-public.

Public blockchains are fully open to the public to allow anyone to attend. By contrast, private blockchains are attendant-limited, distributed peer-to-peer networks to allow only ones who are invited to participate in the network.

Public blockchains have their known problems as follows. 1) They require a plenty of inputs to maintain the network which consists of a number of unspecified ones. 2) Shared information is made open over the entire network. 3) Processing time is very slow.

Conversely, since private blockchains automatically process real-time transactions over a safe network without massive computing performance, they may address the problems with public networks while proving the advantages of blockchain technology. However, private blockchains may be subject to reliability issues due to their centralized control system and consensus structure.

SUMMARY

According to an embodiment, there are provided a payment interface and blockchain platform that may support real-time transactions by accelerating transaction confirmation.

According to an embodiment, a method for automatically providing a cryptocurrency to a recommender using social networking service (SNS) propagation comprises a recommending step in which a blockchain membership node of a member having membership in a proof-of-expansion (PoX) blockchain platform server recommends an identity (ID) of an SNS friend of the member to the PoX blockchain platform server, a registering step in which the PoX blockchain platform server newly registers the ID of the SNS friend as a blockchain membership node, and a reward rate determining step in which the PoX blockchain platform server determines a reward rate for each blockchain member in association with the number of SNS friend IDs that the blockchain member recommends.

The method may further comprise a rewarding step in which the PoX blockchain platform server rewards each blockchain member with a cryptocurrency as per the determined reward rate.

The reward rate determining step may comprise a step for determining a membership grade of the recommending blockchain member depending on the number of SNS friend IDs that the blockchain member node recommends and a step for determining the reward rate for the blockchain member depending on the determined membership grade.

As the number of the SNS friend IDs that the blockchain member node recommends increases, the membership grade of the recommending blockchain member increases.

When a first SNS friend recommended by the blockchain membership node recommends a second SNS friend, a weight may be given to the membership grade of the blockchain member.

The method may further comprise a transaction processing step in which when a cryptocurrency transaction occurs between blockchain members recommended, the PoX blockchain platform server creates a transaction processing request transaction in a blockchain network processing server.

Embodiments of the disclosure allows only SNS friends whose IDs have been verified to participate as guardians to recommend to other people to prevent malicious attacks and protect the participants' information and allow transactions to be made only for the ID verified SNS friends, thus making blockchain technology more reliable and building up and stabilizing blockchain interactions.

According to an embodiment, a blockchain-based cryptocurrency transaction system comprises at least one blockchain holder node, a platform server configuring and storing a member terminal group and configured to allow a blockchain transaction between terminals included in the member terminal group and not to allow a blockchain transaction with a terminal not included in the member terminal group, a first terminal included in the member terminal group, and at least one second terminal connected with the first terminal via the platform server. The first terminal transmits a recommendation request including an identity (ID) of the at least one second terminal to the platform server. In response to the recommendation request, the platform server includes the second terminal corresponding to the ID in the member terminal group and transmits an amount of cryptocurrency corresponding to a number of IDs received from the first terminal. When a blockchain transaction occurs between the first terminal and the second terminal, a processing request including the blockchain transaction is transmitted to the platform server. In response to the processing request, the platform server transmits the blockchain transaction to the at least one blockchain holder node. The at least one blockchain holder node verifies validity of the blockchain transaction according to a blockchain algorithm and transmits a result of the verification to the platform server, and the platform server confirms the blockchain transaction.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein:

FIG. 5 is a view illustrating an example in which a membership grade is determined as per the number of SNS friend IDs recommended, according to an embodiment.

DETAILED DESCRIPTION OF EXEMPLARY EMBODIMENTS

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. When determined to make the subject matter of the disclosure unclear, the detailed description of the known art or functions may be omitted.

Figure 1:
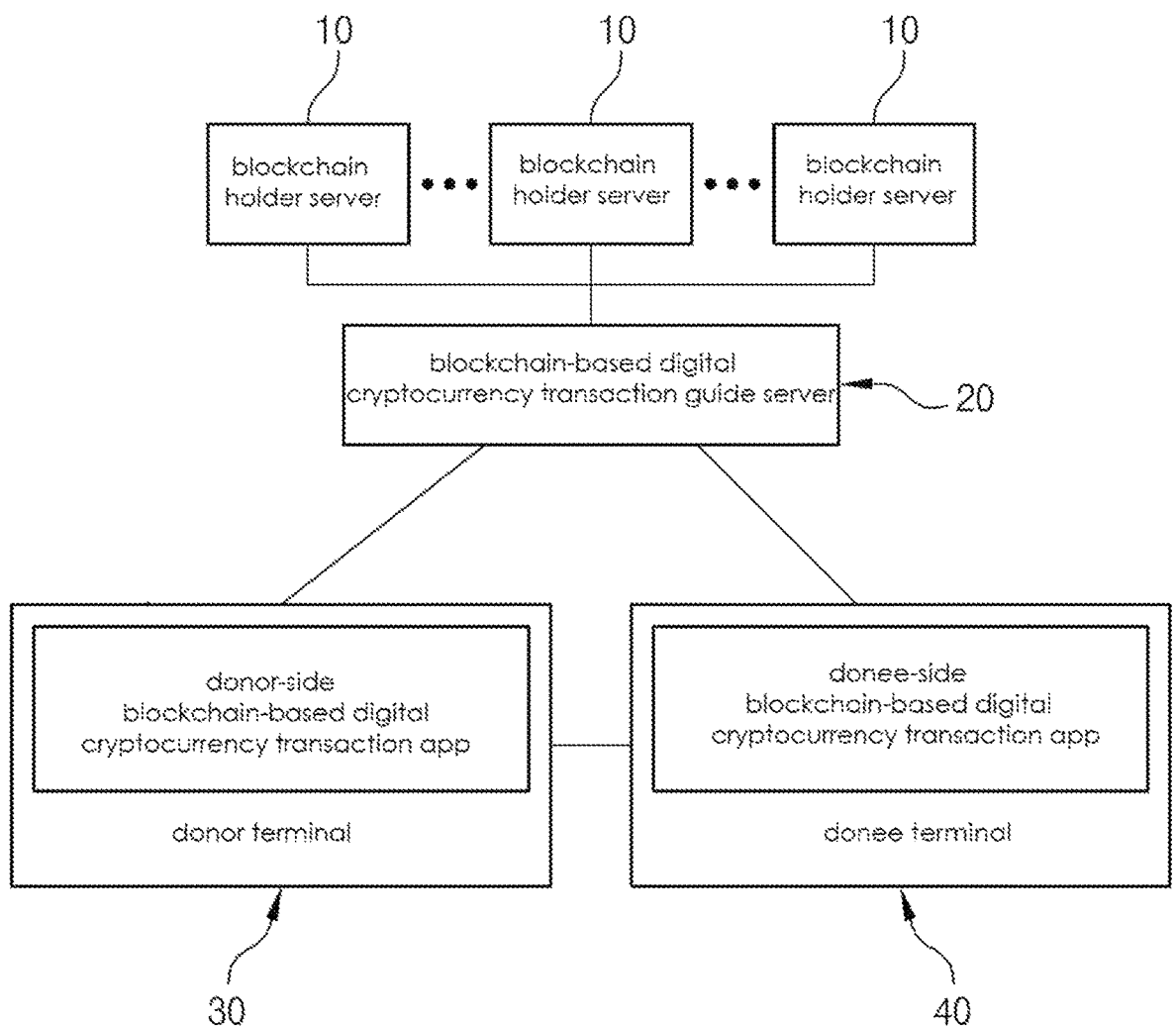
FIG. 1 is a view illustrating a configuration of a cryptocurrency transaction system with an inter-party blockchain.
Figure 2:
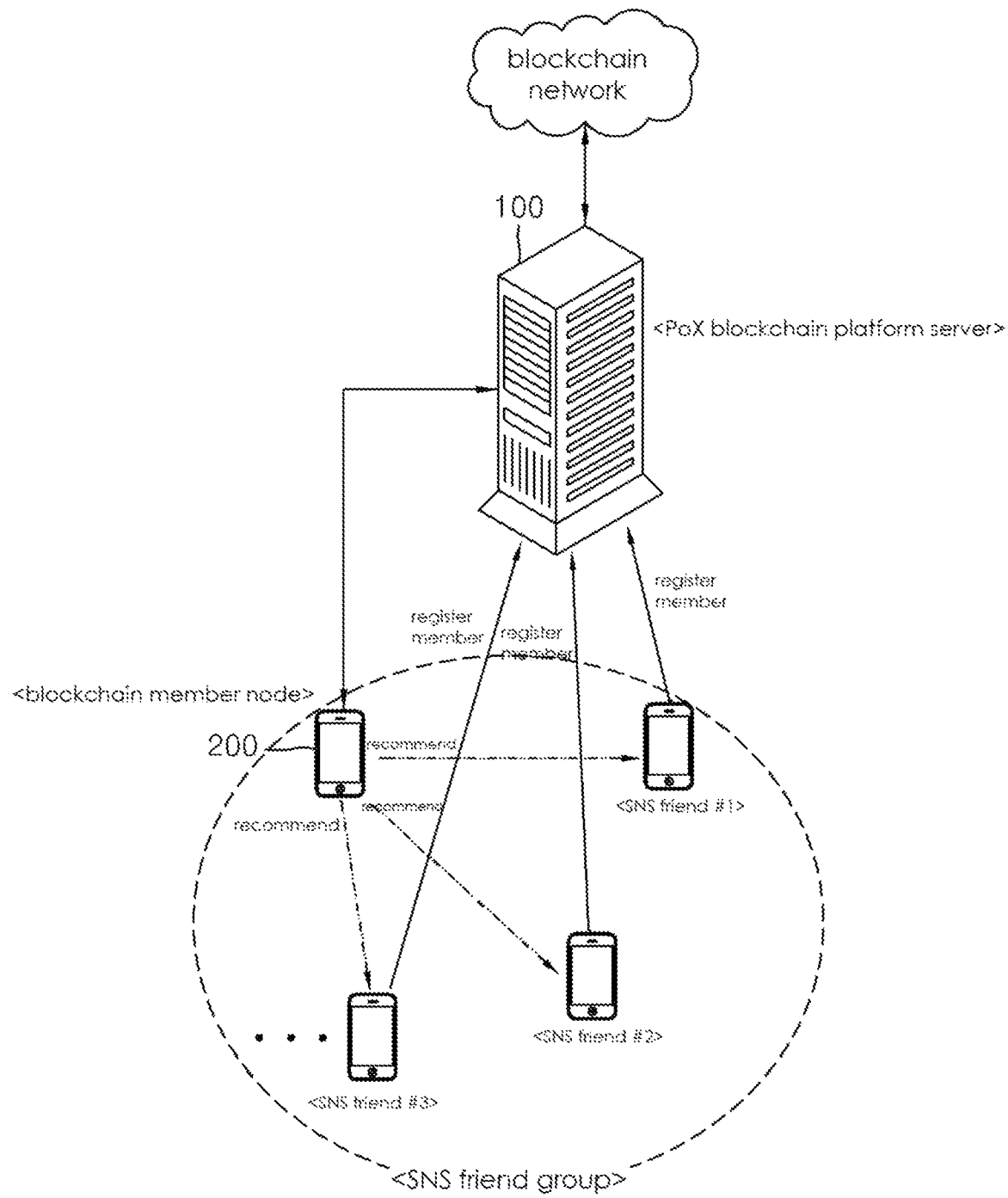
FIG. 2 is a view illustrating a configuration of a system for automatically providing a cryptocurrency to a recommender using propagation on SNS according to an embodiment.
Figure 3:
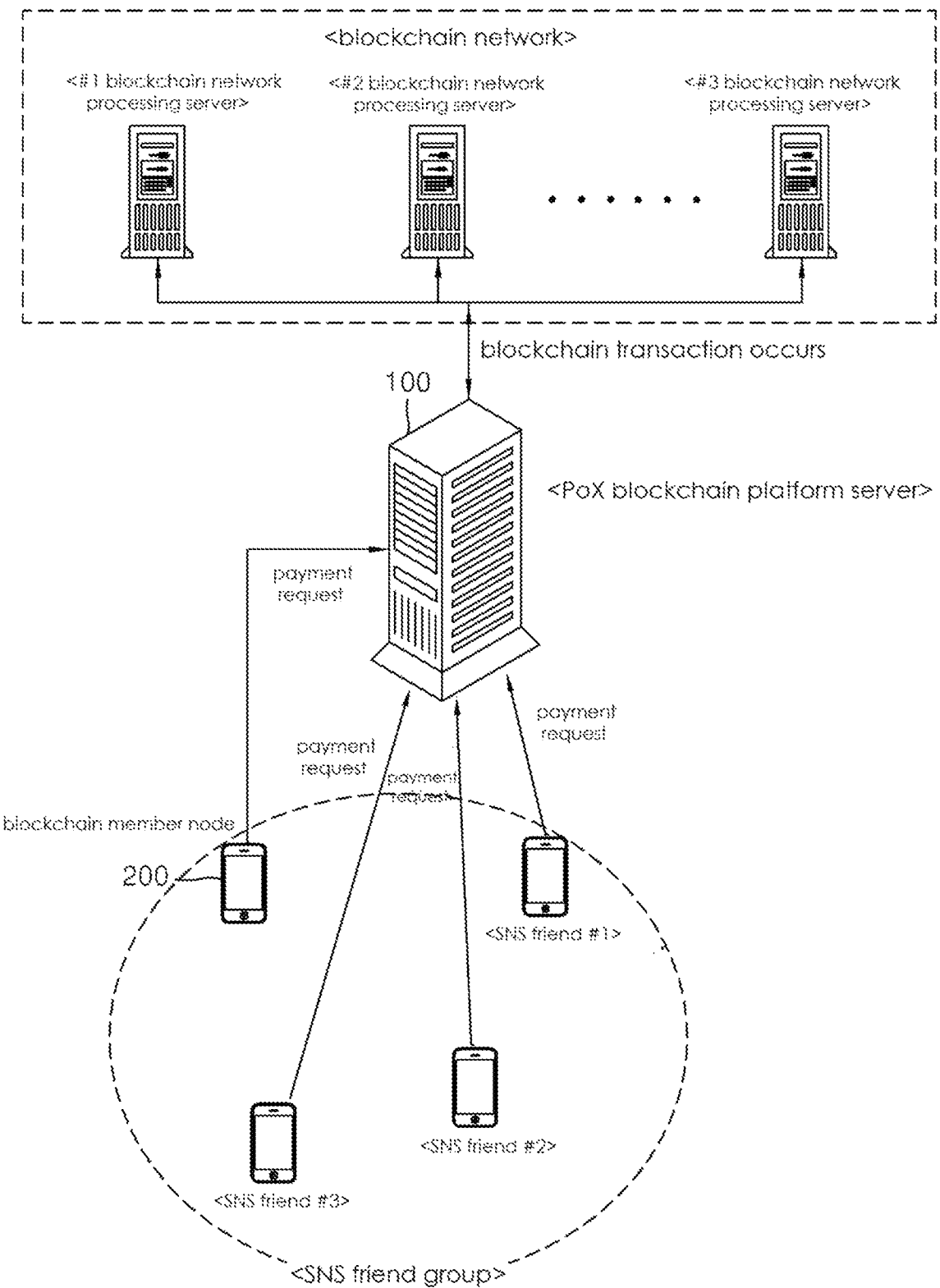
FIG. 3 is a view illustrating an example in which a transaction processing request transaction occurs in a blockchain network processing server.

FIG. 1 is a view illustrating a configuration of a cryptocurrency transaction system with an inter-party blockchain. FIG. 2 is a view illustrating a configuration of a system for automatically providing a cryptocurrency to a recommender using propagation on SNS according to an embodiment. FIG. 3 is a view illustrating an example in which a transaction processing request transaction occurs in a blockchain network processing server.

Prior to describing a system for automatically providing a cryptocurrency to a recommender using propagation on SNS according to an embodiment, blockchain-based cryptocurrency technology is briefly described.

In describing cryptocurrency such as bitcoin, "mining" is a key word. Mining typically refers to a technique to obtain new cryptocurrency. Computers (or terminals) constituting a cryptocurrency network compete with one another to discover a computation value that meets a particular condition, and the computer which first discovers the computation value is to receive a cryptocurrency. This process is called "mining." Mining is not only a method for obtaining cryptocurrency but may also authenticate cryptocurrency transactions.

Cryptocurrencies or virtual currencies have a common transaction ledger called a blockchain.

Briefly, a user downloads her cryptocurrency wallet program (or application) onto her computer. The user then installs the cryptocurrency wallet program or application (which may be simply referred to hereinafter as a "wallet") on her computer. Then, the user's computer runs the program (or application) and synchronizes (or matches) itself with a blockchain recorded in the network. Since the data size reaches a few tens of gigabytes, the sync would typically take three to seven days. After the sync is done, the user may create her own address (which is similar in concept to a bank account) on her wallet and may transmit or receive cryptocurrencies through the address. (The cryptocurrency address is a 34-digit word which is a combination of English capital/small letters and numbers, such as 1MowqQrQJL5AeaDMpX35B6EiJ4qnXPJnFp.

In all types of cryptocurrencies or virtual currencies driven on a blockchain system, the user end is constituted of a pair of keys formatted as 'private key-public key (address).' The public key and the private key, respectively, correspond to a bank account number and a user password, which match each other.

Referring to FIG. 1, a blockchain-based cryptocurrency transaction system may include a blockchain holder server 10, a cryptocurrency transaction guide server 20, a donor terminal 30, and a donee terminal 40.

There may be provided multiple blockchain holder servers 10. Upon receipt of blockchain-containing transaction information for digital cryptocurrency transactions, the blockchain holder servers 10 may be blockchain-equipped devices, and the blockchain holder servers 10 may verify the transaction information to thereby authenticate the blockchain-based digital cryptocurrency transactions and record the transaction information according to the authentication. The cryptocurrency holder servers 10 may be peer-to-peer (P2P) network-based distributed databases, i.e., devices constituting the cryptocurrency network, which may perform digital cryptocurrency transactions with blockchains by authenticating and recording the digital cryptocurrency transactions with blockchains.

The blockchain-based digital cryptocurrency transaction guide server 20 which is operated by a cryptocurrency exchange may be a member of the configuration of the blockchain holder servers 10.

The transmission of the blockchain-containing transaction information for cryptocurrency transactions (hereinafter, such blockchain-containing transaction information may simply be referred to as transaction information) may be defined in a communication protocol. When the transaction information occurs, one node (which may be a blockchain holder server) may propagate the transaction information to next eight designated nodes, and each of the eight nodes, which receive the transaction information, may also propagate the transaction information to next eight designated nodes. As such, the transaction information may be propagated to all of the nodes, i.e., blockchain holder servers 10, which have blockchains necessary to perform blockchain-containing digital cryptocurrency transactions.

Meanwhile, private blockchains may be subject to reliability issues due to their centralized control system and consensus structure.

According to an embodiment, there are provided a payment interface and blockchain platform that may enable and support real-time transactions by accelerating transaction confirmation.

According to an embodiment, referring to FIG. 2, a system for automatically providing a cryptocurrency to a recommender using social network service/site (SNS) propagation includes a PoX blockchain platform server 100. The PoX blockchain platform server 100 may have substantially the same configuration as a typical web server in terms of hardware and may be implemented in various programming languages, such as C, C++, Java, Visual Basic, or Visual C in terms of software while including programming modules that have various functions. The PoX blockchain platform server 100 may also be implemented with a server program which is provided in diverse manners depending on operating systems (OSs), such as Dos, Window, Linus, Unix, or Macintosh.

The term "proof of expansion (PoX)" as used herein may refer to a system in which a platform user, e.g., a recommender, forms a relationship as she is linked to the IDs of other SNS friends via her ID. As such process repeats, the platform may expand and provide a reasonable compensation to the user. The problems with prior cryptocurrency may be addressed in terms that benefits may be obtained depending on private capabilities.

To that end, according to an embodiment, in the system for automatically providing a cryptocurrency to a recommender using propagation on SNS, if a blockchain member node 200 registered as a member in the PoX blockchain platform server 100 recommends the identity (ID) of the member's SNS friend to the PoX blockchain platform server 100, the PoX blockchain platform server 100 newly registers the ID of the member's SNS friend as a blockchain member node 200.

Referring to FIGS. 1 and 2, according to an embodiment, a blockchain-based cryptocurrency transaction system may include at least one blockchain holder node (e.g., the blockchain holder node 10), a platform server (e.g., the PoX blockchain platform server 100) configuring and storing a member terminal group (e.g., a group of blockchain member nodes 200) and configured to allow a blockchain transaction between terminals (e.g., the blockchain member nodes 200) included in the member terminal group and not to allow a blockchain transaction with a terminal not included in the member terminal group, a first terminal (e.g., one of the blockchain member nodes 200) included in the member terminal group, and at least one second terminal (e.g., one or more of the blockchain member nodes 200) connected with the first terminal via the platform server. The first terminal may transmits a recommendation request including an identity (ID) of the at least one second terminal to the platform server. In response to the recommendation request, the platform server includes the second terminal corresponding to the ID in the member terminal group and transmits the amount of cryptocurrency corresponding to the number of IDs received from the first terminal. When a blockchain transaction occurs between the first terminal and the second terminal, a processing request including the blockchain transaction may be transmitted to the platform server. In response to the processing request, the platform server may transmit the blockchain transaction to the at least one blockchain holder node. The at least one blockchain holder node may verify the validity of the blockchain transaction according to a blockchain algorithm and transmits a result of the verification to the platform server, and the platform server may confirm the blockchain transaction.

The blockchain network of FIG. 2 may include at least one of the blockchain holder servers 10, the blockchain-based digital cryptocurrency transaction guide server 20, the donor terminal 30, and the done terminal 40.

As shown in FIG. 2, each member node allows SNS friends, which it recommends, to have membership in the PoX blockchain platform server 100, thereby establishing an individual friend social network.

The PoX blockchain platform server 100 determines a reward rate for each blockchain member depending on the number of the IDS of SNS friends that each blockchain member node 200 recommends. When the compensation rate is determined the PoX blockchain platform server 100 rewards each blockchain member with cryptocurrencies as per the determined reward rate.

In rewarding each blockchain member with cryptocurrencies as per the determined reward rate, the PoX blockchain platform server 100 may determine the membership grade of the recommending blockchain member depending on the number of the SNS friend IDs that the blockchain member node recommends and may then determine the reward rate for the blockchain member depending on the determined membership grade.

The more SNS friend IDs as recommended by the blockchain member node are, the higher membership grade the recommending blockchain member may have.

Where a first SNS friend, who the blockchain member node recommends, recommends a second SNS friend, the membership grade of the blockchain member who recommended the first SNS friend may be given a weight.

Referring to FIG. 3, where a cryptocurrency transaction occurs between recommended blockchain members, the PoX blockchain platform server 100 creates a transaction processing request transaction in a blockchain network processing server.

The blockchain network processing server, upon receiving a blockchain sale confirmation request from the PoX blockchain platform server 100, propagates sale request information-based blockchain transactions to neighbor nodes to thereby complete sale confirmation (sale authentication and recording) and sends a sale confirm complete message to the PoX blockchain platform server 100. A bitcoin blockchain network processing server may exchange six confirmations with a neighbor node per blockchain transaction, thereby completing the transaction.

To that end, the blockchain network processing server may receive blockchain-containing transaction information for a cryptocurrency transaction (simply referred to as blockchain-containing transaction information) and authenticate the blockchain-based cryptocurrency transaction by verifying the blockchain-containing transaction information. The blockchain network processing server is equipped with a blockchain in which the blockchain-containing transaction information is recorded according to the authentication. There may be provided a plurality of blockchain network processing servers. The blockchain network processing servers may be devices constituting a P2P network-based decentralized blockchain network, which may perform blockchain-containing cryptocurrency transactions by confirming (authenticating and recording) blockchain-containing cryptocurrency transactions.

In blockchain payment, embodiments of the disclosure allows only SNS friends whose IDs have been verified to participate as guardians to recommend to other people to prevent malicious attacks and protect the participants' information and allow transactions to be made only for the ID verified SNS friends, thus making blockchain technology more reliable and building up and stabilizing blockchain interactions.

Figure 4:
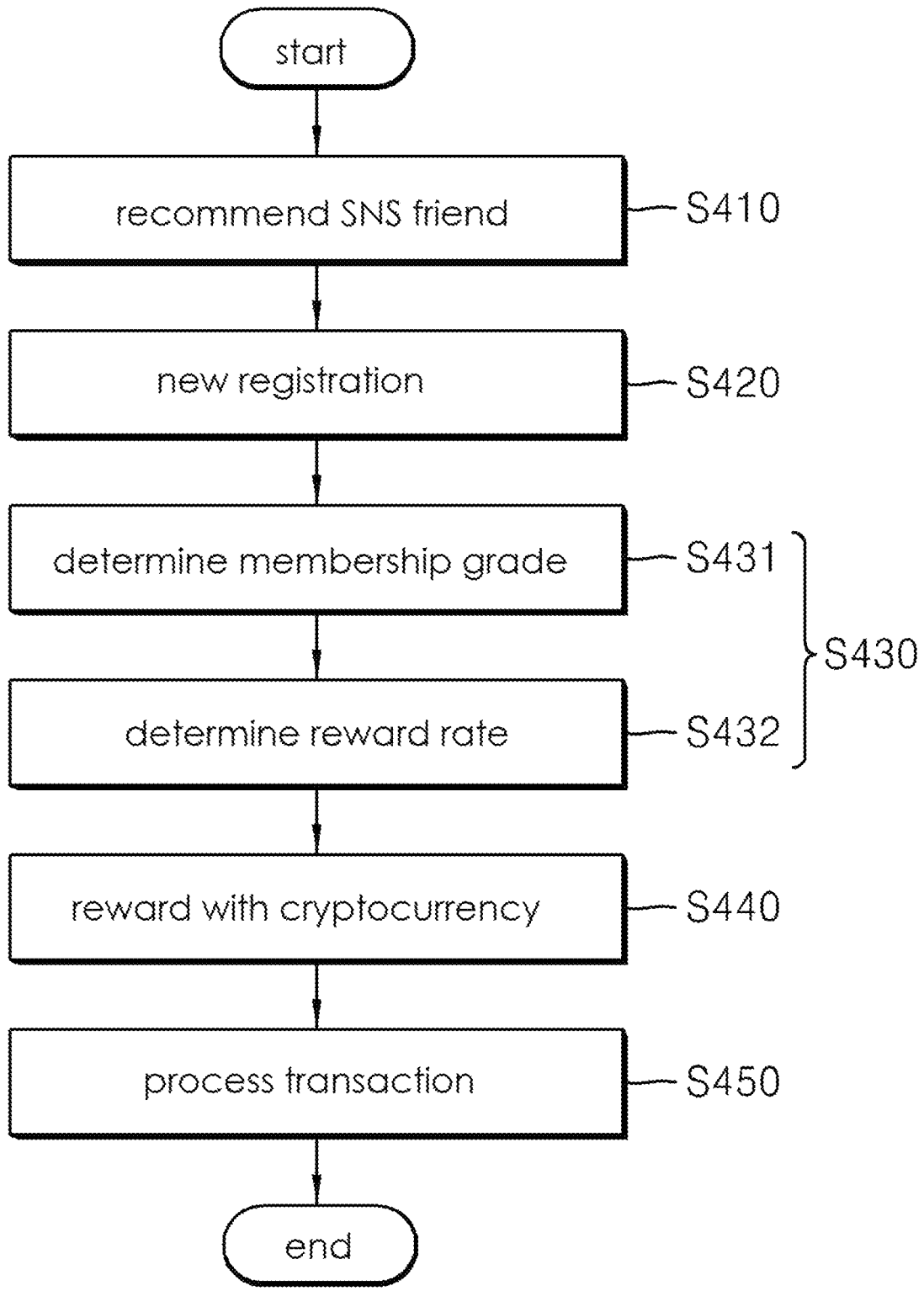
FIG. 4 is a flowchart illustrating a method for automatically providing a cryptocurrency to a recommender using propagation on SNS according to an embodiment.
Figure 6:
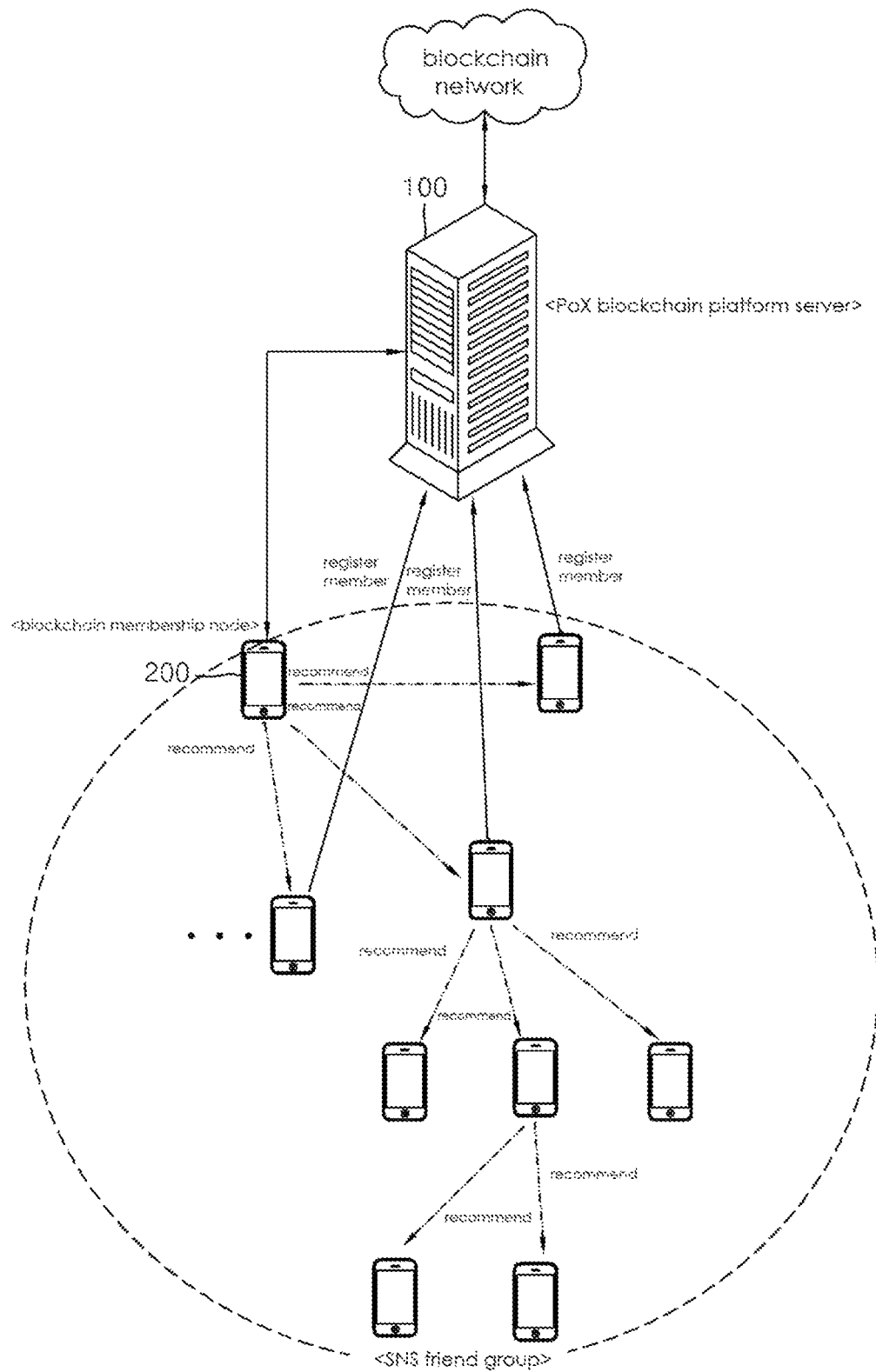
FIG. 6 is a view illustrating an example in which multi-level recommendation is performed according to an embodiment.

FIG. 4 is a flowchart illustrating a method for automatically providing a cryptocurrency to a recommender using propagation on SNS according to an embodiment. FIG. 5 is a view illustrating an example in which a membership grade is determined as per the number of SNS friend IDs recommended, according to an embodiment. FIG. 6 is a view illustrating an example in which multi-level recommendation is performed according to an embodiment.

Referring to FIG. 4, a method for automatically providing a cryptocurrency to a recommender using propagation on SNS may include a step S410 in which a blockchain membership node 200 registered as a member in the PoX blockchain platform server 100 recommends the ID of the member's SNS friend to the PoX blockchain platform server 100, a step S420 in which the PoX blockchain platform server 100 newly registers the ID of the member's SNS friend as a blockchain member node 200, and a step S430 in which the PoX blockchain platform server 100 determines a reward rate for each blockchain member depending on the number of SNS friend IDs that each blockchain membership node 200 recommends. The method may further include a cryptocurrency rewarding step S440 and a transaction processing step S450. The method is described below in greater detail.

In step S410, the blockchain membership node 200 registered as a member in the PoX blockchain platform server 100 recommends the IDs of the member's SNS friends to the PoX blockchain platform server 100. The blockchain membership node 200 may be a terminal of the member registered in the PoX blockchain platform server 100. The blockchain membership node 200 may receive selection, by the member, of SNS friend IDs registered in the member's terminal and recommend the SNS friend IDs to the PoX blockchain platform server 100.

In step S420, the PoX blockchain platform server 100 newly registers the IDs of the member's SNS friends as blockchain membership nodes 200.

In step S430, the PoX blockchain platform server 100 determines a reward rate for each blockchain member in association with the number of SNS friend IDs that each blockchain membership node 200 recommends.

Step S430 may include the step S431 of determining a membership grade of the recommending blockchain member depending on the number of the SNS friend IDs that the blockchain membership node 200 recommends and the step S432 of determining the reward rate for the blockchain member depending on the determined membership grade.

In other words, the membership grade may be determined depending on how many SNS friends the member recommends. Referring to FIG. 5, as the number of SNS friend IDs recommended by the blockchain membership node 200 increases, the membership grade of the recommending member increases.

Where a first SNS friend recommended by the blockchain membership node 200 recommends a second SNS friend, a weight may be given to the membership grade of the member who recommended the first SNS friend. As such, embodiments of the disclosure may be made in a multi-level implementation.

For example, as shown in FIG. 6, a first member recommends her SNS friend (referred to as a first SNS friend for ease of description) and the first SNS friend is registered in the PoX blockchain platform server 100. The first SNS friend recommends her SNS friend, which is referred to as a second SNS friend for ease of description, and the second SNS friend is registered in the PoX blockchain platform server 100. As such, multi-level membership registration may be rendered possible, and the first recommending blockchain member may be given a weight to her membership grade as a reward and hence a higher membership grade.

Where such multi-level registration is performed over several times, the weight for the first recommending blockchain member may increase, and such increase in the weight may be accelerated as more and more SNS friends are registered over multiple levels as members in the PoX blockchain platform server 100. Such multi-level membership enables a building-up of a reliable blockchain member family.

In step S440, the PoX blockchain platform server 100 provides cryptocurrencies to each blockchain member according to the determined reward rate. Such rewarding as per the reward rate may be performed by automatically providing cryptocurrencies to the blockchain membership node 200 who recommends a SNS friend.

In step S450, where a cryptocurrency transaction occurs between blockchain members recommended, the PoX blockchain platform server 100 creates a transaction processing request transaction in the blockchain network processing server as shown in FIG. 3. For example, upon receiving a request for payment using cryptocurrency from the blockchain membership node 200, the PoX blockchain platform server 100 allows a transaction processing request transaction to occur in the blockchain network processing server, thereby enabling a blockchain confirmation to occur.

The transmission of the blockchain-containing transaction information for cryptocurrency transactions (hereinafter, such blockchain-containing transaction information may simply be referred to as transaction information) may be defined in a communication protocol. When the transaction information occurs, one node (which may be a blockchain holder server) may propagate the transaction information to next eight designated nodes, and each of the eight nodes, which receive the transaction information, may also propagate the transaction information to next eight designated nodes. As such, the transaction information may be propagated to all of the nodes, i.e., blockchain holder servers 10, which have blockchains necessary to perform blockchain-containing digital cryptocurrency transactions.

As transactions occur between reliable friends or acquaintances, the transaction confirmation time may be reduced.

Generally, blockoff time and transaction confirmation time are closely related to each other. For example, since a successful cryptocurrency transaction is designed to undergo a six-step procedure (60 minutes), it may be nearly impossible to adopt cryptocurrency transactions for real-time payments or daily-life transactions. Some users attempt to modify or manipulate the six-step procedure to shorten the transaction time.

According to an embodiment, to ensure real-time payment and transactions, a super node and a transfer chain are implemented, enabling payment and a transaction in an international exchange to be successfully done within three seconds.

While the disclosure has been shown and described with reference to exemplary embodiments thereof, it will be apparent to those of ordinary skill in the art that various changes in form and detail may be made thereto without departing from the spirit and scope of the disclosure as defined by the following claims.

What is claimed is:

1. A blockchain-based cryptocurrency transaction system, comprising:
   at least one blockchain holder node;
   a platform server configuring and storing a member terminal group of only member terminals of a social network service (SNS), the platform server configured to allow a blockchain transaction between the member terminals included in the member terminal group and not to allow a blockchain transaction with a terminal not included in the member terminal group;
   a first terminal included in the member terminal group; and
   at least one second terminal of the SNS, connected with the first terminal via the platform server, wherein
   the first terminal transmits a recommendation request including an identity (ID) of the at least one second terminal to the platform server, wherein
   in response to the recommendation request, the platform server includes the second terminal corresponding to the ID in the member terminal group, registers the second terminal as a new blockchain membership node, and transmits an amount of cryptocurrency corresponding to a number of IDs received from the first terminal, wherein
   when a blockchain transaction occurs between the first terminal and the second terminal, a processing request including the blockchain transaction is transmitted to the platform server, wherein
   in response to the processing request, the platform server transmits the blockchain transaction to the at least one blockchain holder node, wherein
   the at least one blockchain holder node verifies validity of the blockchain transaction according to a blockchain algorithm and transmits a result of the verification to the platform server, and the platform server confirms the blockchain transaction, wherein
   the platform server is a proof-of-expansion (PoX) platform server.

* * * * *